Dec. 20, 1960 H. A. MITCHELL ET AL 2,965,392
RETRACTABLE WHEEL ASSEMBLAGE
Filed Oct. 2, 1959 2 Sheets-Sheet 1
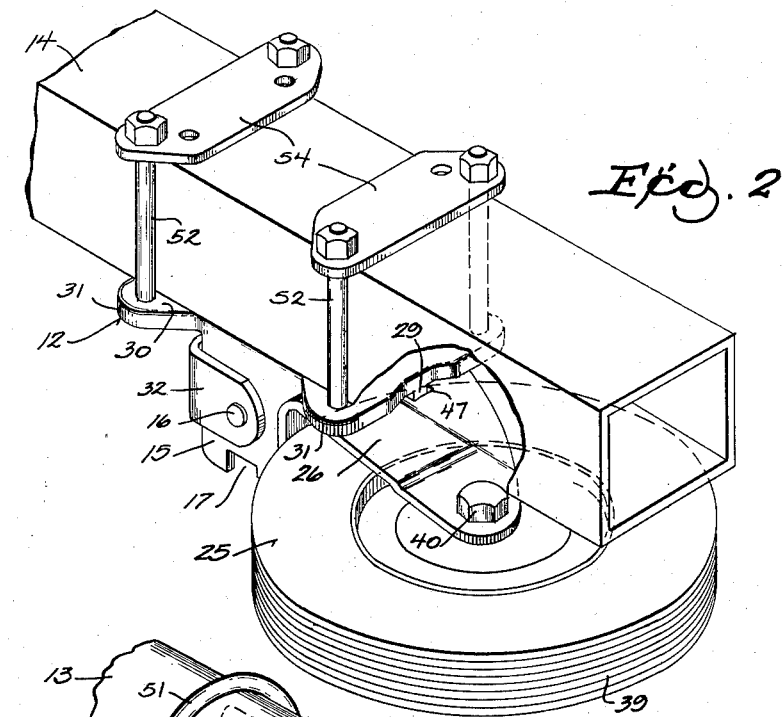
Fig. 2
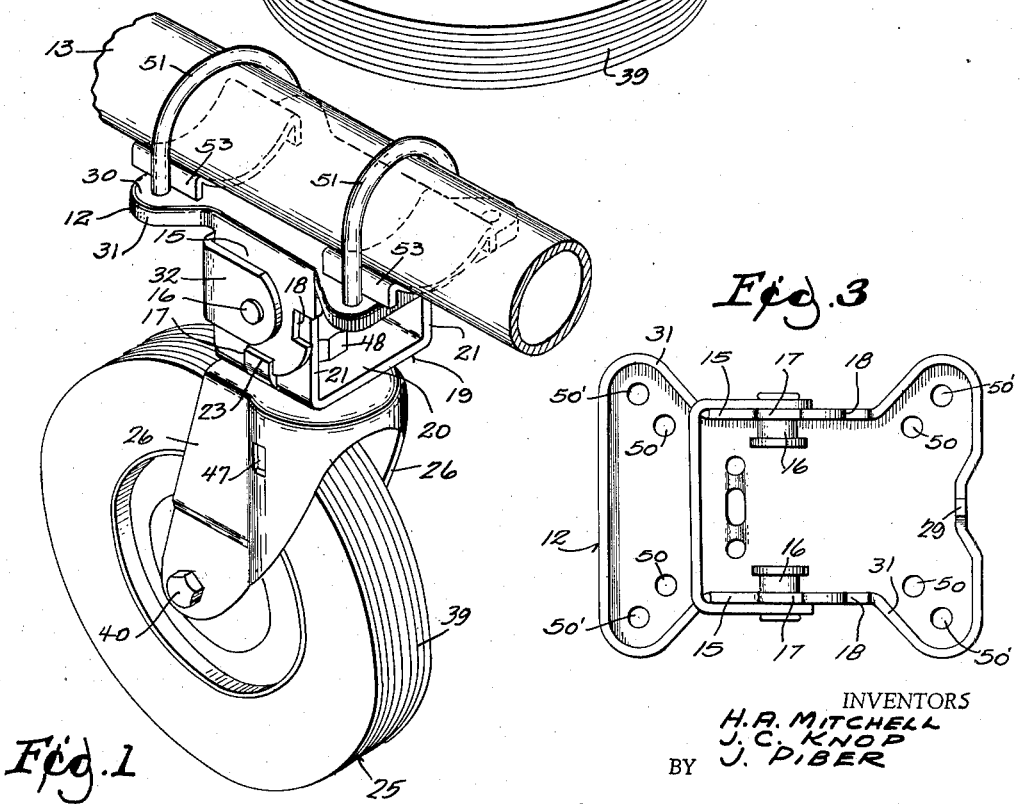
Fig. 3
Fig. 1
INVENTORS
H. A. MITCHELL
J. C. KNOP
BY J. PIBER
Lieber, Lieber & Nilles
ATTORNEYS Dec. 20, 1960    H. A. MITCHELL ET AL    2,965,392
RETRACTABLE WHEEL ASSEMBLAGE
Filed Oct. 2, 1959    2 Sheets-Sheet 2

INVENTORS
H. A. MITCHELL
J. C. KNOP
J. PIBER
BY
Lieber, Lieber & Nilles
ATTORNEYS United States Patent Office 2,965,392
Patented Dec. 20, 1960

2,965,392
RETRACTABLE WHEEL ASSEMBLAGE

Harry A. Mitchell, Mukwonago, and James C. Knop and John Piber, Milwaukee, Wis., assignors to The Fulton Company Filed Oct. 2, 1959, Ser. No. 844,113

6 Claims. (Cl. 280—150.5)

This invention relates generally to retractable supporting wheel assemblages for the draft tongues of vehicles such as trailers, and it relates more specifically to improvements in the construction and operation of such assemblages especially of the type embodying a caster wheel adapted to be swung from active ground engaging position into inactive position beneath the vehicle tongue, and vice versa.

The primary object of the present invention is to provide an improved retractable wheel assemblage for vehicle draft tongues, which is simple and durable in construction while also being conveniently manipulable and highly effective in use.

Some of the more important specific objects of the invention are as follows:

To provide a unit embodying a trailer tongue supporting caster wheel which may be positively locked in both active lowered position and inactive elevated position, but which is rapidly and easily displaceable from either of said positions into the other.

To provide a retractable wheel mounting comprising few sturdy parts which can be readily assembled for use and attached to vehicle draft tongues of various types and sizes.

To provide a retractable wheel support in which the major elements may be accurately produced from sheet metal with the aid of punches and dies, and assembled to provide an exceedingly strong wheel mounting.

To provide a retractable caster wheel assembly wherein the wheel is adapted to revolve freely about an upright pivotal axis during normal use while being swingable into an approximately horizontal and positively held inactive position beneath the trailer tongue.

To provide a retractable caster wheel support in which the wheel can be swung from active into inactive position and vice versa, by merely exerting a pull thereon longitudinally of its pivotal axis, and wherein the wheel is automatically locked in either of said positions upon release of the pull at the end of each such swinging movement.

To provide a new and improved retractable caster wheel mounting unit adapted to be easily attached to various types of vehicle draft tongues, and which may be produced at moderate cost.

These and other still more specific objects and advantages of the invention will be apparent from the following detailed description.

A clear conception of the features constituting the present improvement, and of the construction and operation of a typical commercial retractable wheel assemblage embodying the invention, may be had by referring to the drawings accompanying and forming a part of this specification wherein like reference characters designate the same or similar parts in the various views.

Fig. 1 is a perspective view of one of the improved retractable wheel assemblages applied to a cylindrical trailer tongue and showing the wheel lowered into active position;

Fig. 2 is a similar perspective view of the same retractable wheel assemblage applied to a square section trailer tongue but showing the wheel elevated into inactive position;

Fig. 3 is a bottom view of the mounting bracket or channel of a wheel assemblage such as shown in Figs. 1 and 2, with the swingable wheel suspension elements omitted;

Figure 4:
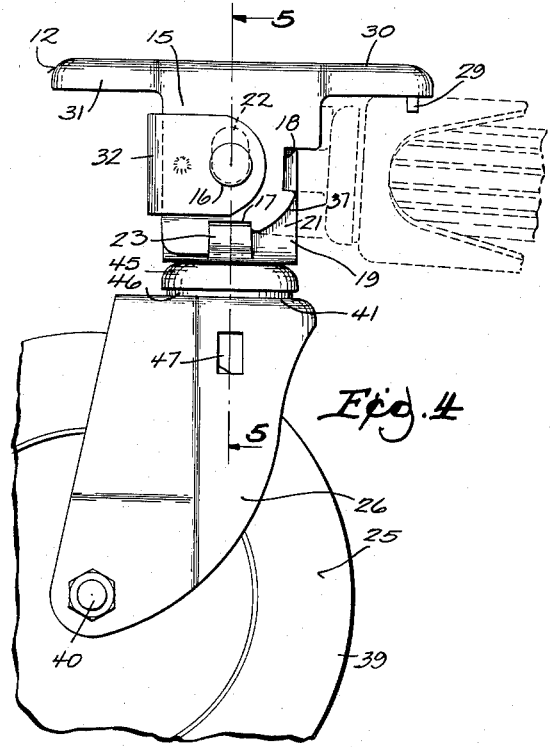
Fig. 4 is a fragmentary side view of the retractable wheel assemblage alone, showing the lowered active wheel in solid lines, and the elevated or retracted inactive wheel in dot-and-dash lines.

While the invention has been shown and described herein as having been embodied in a retractable caster wheel assemblage especially adapted for attachment to the draft tongue of a two wheel trailer in order to provide a three wheel support for such a trailer when detached from its hauling vehicle, some of the improvements may be susceptible of more general application; and it is also contemplated that specific descriptive terms employed herein be given the broadest interpretation consistent with the actual disclosure.

Referring to the drawings, the improved retractable wheel assemblage shown therein, comprises in general a bracket or channel 12 attachable to a trailer tongue 13 or 14 and having spaced depending side walls 15 provided with axially alined but separated pivots 16 and with lower and upper sets of peripheral notches 17, 18 respectively radiating from the pivots 16; a yoke 19 having a base 20 formed integral with spaced side walls 21 confined between the channel walls 15 and having elongated slots 22 therein through which the pivots 16 project to permit the yoke to swing about and to move laterally of the pivotal axis, the yoke 19 also being provided with lugs 23 alternately cooperable with the channel notches 17, 18 to interchangeably retain the yoke in lowered and elevated positions; one or more tension springs 24 connecting the yoke base 20 with the channel 12 between the pivots 16 to urge the lugs 23 toward the common pivotal axis; and a caster wheel 25 having a supporting fork 26 journalled for rotation relative to the yoke base 20 about a headed pivot bolt or shaft 27.

The channel 12, yoke 19 and fork 26 may all be accurately formed of durable unitary sheet metal blanks with the aid of punches and dies, and the channel 12 is also provided with an integral end projection 29 which extends downwardly from its upper attaching platform 30 midway between the walls 15. This platform 30 is also stiffened by a peripheral flange 31 which like the walls 15 is formed integral with the platform, and the channel walls 15 are interconnected and prevented from spreading by a sheet-metal saddle 32 which is welded to and spans the channel walls 15 at their ends remote from the projection 29, see Figs. 3 to 7. The pivots 16 have their outer reduced ends riveted to the channel walls 15 and to the side flanges of the saddle 32 thereby producing a rigid mounting for these pivots, and the inner pivot ends 33 are enlarged and coact with washers 34 to cover the slots and hold the yoke walls 21 swingably suspended from the pivots 16.

Figure 6:
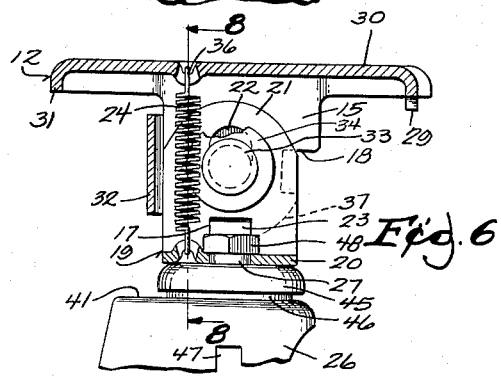
Fig. 6 is a fragmentary central longitudinal vertical section through the upper portion of the assemblage taken along the line 6—6 of Fig. 5 and showing the wheel supporting yoke lowered.
Figure 7:
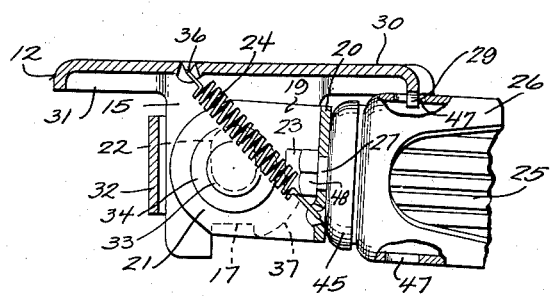
Fig. 7 is a fragmentary vertical section similar to that of Fig. 6 but showing the wheel supporting yoke elevated.

In the embodiment shown, there are two relatively strong tension springs 24 provided, the opposite ends of which have hooks 36 adapted to engage formations on the channel platform 30 and on the yoke base 20 to constantly urge the yoke 19 toward the common axis of the two pivots 16, and when the yoke 19 and the elements which are suspended therefrom by the pivot shaft 27, are swung from lowered or active position as in Figs. 1 and 6 into elevated or inactive positions as in Figs. 2 and 7, and vice versa, the springs 24 swing freely between the inner separated pivot ends 33 without exerting direct lateral pressure against the pivots 16. The sets of lower and upper peripheral notches 17, 18 formed in the channel walls 15 and which radiate from the common axis of the pivots 16 and are horizontally alined, are spaced apart approximately 90° and are connected by arcuate surfaces 37 formed on these walls 15; and the lugs 23 which are formed integral with the yoke 19 are adapted to ride along the adjacent arcuate surfaces 37 when the yoke is swung from one position into the other are also alternately interlockable with the channel notches 17, 18.

Figure 5:
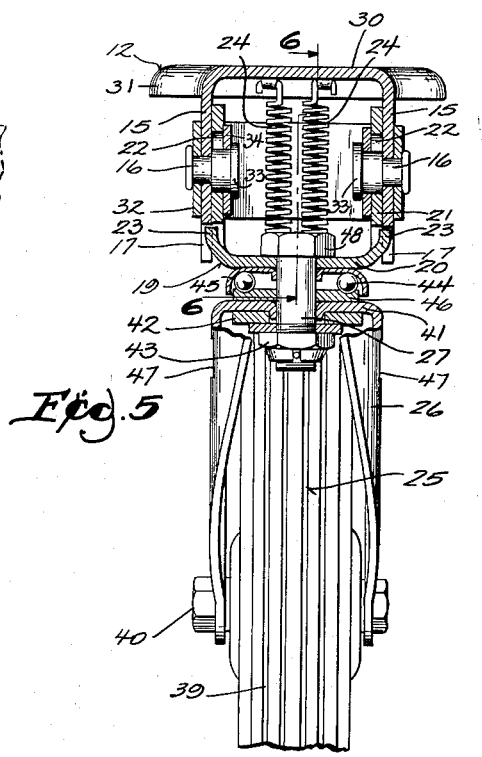
Fig. 5 is a transverse vertical section through the same assemblage with the wheel lowered into active position, the section having been taken along the line 5—5 of Fig. 4.

The caster wheel 25 may be of any selected diameter and is usually provided with a rubber tire 39, and this wheel is freely rotatable about an axle 40 mounted in the opposite side walls or prongs of the fork 26 while the prong connecting portion 41 of this fork is swiveled for free rotation about the pivot shaft 27 and is retained in position thereon by a washer 42 and a detachable washer and lock nut 43, see Fig. 5. An anti-friction bearing consisting primarily of a series of bearing balls 44 confined between an upper inverted sheet metal cup-shaped race 45 coacting with yoke base 20 and a lower flat sheet-metal wearing race 46, permits the fork 26 and the wheel 25 to swivel or rotate freely about the axis of the shaft 27 during normal use. But the prongs of the fork are provided with elongated openings 47 which are adapted to engage the channel projection 29 to lock the wheel 25 in approximately horizontal position, when elevated beneath the trailer tongue as shown in Figs. 2 and 7. The head 48 of the pivot shaft 27 may be welded or otherwise rigidly attached to the base 20 of the yoke 19 so as to prevent this shaft from turning.

In order to enable the improved caster wheel assemblage to be attached to vehicle draft tongues 13, 14 of various types, the platform 30 of the channel 12 is provided with several sets of inner and outer holes 50, 50' as shown in Fig. 3, with which either U-shaped bolts 51 are cooperable as in Fig. 1, or straight bolts 52 are cooperable as in Fig. 2. When the wheel assemblage is fastened to a cylindrical tongue 13 as in Fig. 1, sheet metal socket elements 53 are preferably interposed between the channel platform 30 and the tongue 13 and the opposite ends of each U-bolt 51 are caused to coact with the inner holes 50 on one side and with the outer holes 50' on the opposite side of the tongue thereby disposing the bolts 51 in planes disposed at oblique angles relative to each other and resisting tendency of the assemblage to rotate about the tongue axis. When the wheel assemblage is fastened to a square tongue 14 as in Fig. 2, sheet metal straps 54 are caused to coact with the top surface of the tongue and the straight bolts 52 may be applied through end holes in these straps and through the proper holes in the channel platform 30 on the opopsite sides of the tongue 14, thus permitting the improved assemblage to be effectively secured to various types of vehicle draft tongues.

Figure 8:
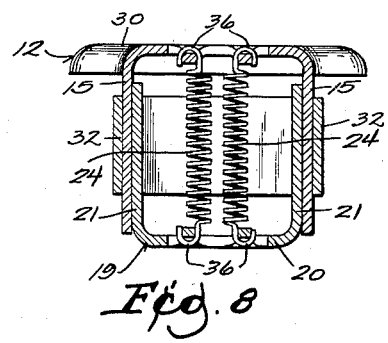
Fig. 8 is a transverse vertical section through the channel and yoke of the retractable wheel assemblage, taken along the line 8—8 of Fig. 6.

When the various elements of the improved retractable wheel assemblage have been properly constructed it is first necessary to attach the reenforcing saddle 32 to the channel walls 15 and to apply the pivots 16 and washers 34 to the slots 22 in the walls 21 of the yoke 19 before these pivots are riveted to the channel 12 and saddle 32. The swivel shaft 27 may be welded to the yoke base 20 before the yoke is assembled within the channel 12, and the anti-friction ball bearing may be applied to this shaft 27 and the wheel 25 and its fork 26 may thereafter be attached to the pivot shaft with the aid of the washer 42 and lock nut 43 in an obvious manner. After the unit has been thus properly assembled and attached to a vehicle draft tongue of either type, its normal use is as follows:

Assuming the assemblage to be in lowered or active position as in Fig. 1, the wheel 25 will then function to support the vehicle tongue in substantially horizontal position and will permit the vehicle to be moved in any direction due to the fact that the wheel will swivel freely about the upright pivot shaft 27 and is freely rotatable about its axle 40 while the fork 26 coacts with the anti-friction bearing to carry the load. The yoke 19 and the pivot shaft 27 which is rigidly attached thereto will then be positively locked in upright position by the tension springs 24 which hold the lugs 23 within the lower notches 17 of the channel 12 as in Figs. 1 and 6, and the springs 24 will be disposed vertically between the pivots 16 as in Figs. 6 and 8.

When it is desired to retract or elevate the wheel 25 into inactive position, it is only necessary to lift the vehicle tongue and to pull the wheel and its fork 26 downwardly together with the pivot shaft 27 and yoke 19 against the restraining action of the springs 24, sufficiently to withdraw the lugs 23 from within the lower notches 17, and the slots 22 in the yoke walls 21 will permit such lateral displacement of the yoke 19 relative to the pivots 16. The yoke 19 together with the wheel 25 and its fork 26 may then be swung upwardly about the pivots 16 and simultaneously rotated 90° about the axis of the shaft 27, while the lugs 23 ride along the arcuate surfaces 37 of the channel walls, until these lugs reach positions of alinement with the upper notches 18, whereupon the springs 24 will act to automatically lock the lugs 23 within these notches while the projection 29 of the channel 12 enters the adjacent opening 47 in the fork to maintain the wheel in horizontal retracted position beneath the tongue, as in Figs. 2 and 7.

During this wheel retracting operation the springs 24 will swing between the pivots 16 and will ultimately assume an inclined position as in Fig. 7, and the elongated slots 22 in the yoke walls must be of sufficient length to permit the yoke lugs 23 to be withdrawn from the notches 17, 18. The openings 47 in the wheel supporting fork 27 must also be of sufficient length to permit such withdrawal of the lugs 23, and the wheel may be turned 90° about the axis of the shaft 27 in either direction in order to place it in horizontal position when retracted since there is an opening 47 on each side of the fork 27. In order to subsequently lower the wheel into active position, it is only necessary to pull the wheel, fork and yoke bodily away from the pivots 16 and to swing these parts downwardly whereupon the springs 24 will again become active to lock the wheel 25 in lowered position when the lugs 23 reach and snap into the lower notches 17, as in Figs. 1 and 7.

From the foregoing detailed description of the construction and operation of the device, it should be apparent that the present invention in fact provides an improved retractable wheel assemblage for vehicle draft tongues, which is simple and extremely durable in construction, and efficient in operation. The improved unit is flexible in its adaptations since it can be readily applied to various types of draft tongues 13, 14 and wheels of different types and diameters may be installed in the fork 26. While the springs 24 are relatively strong the weight of the wheel 25 and its fork 26 minimize the downward pull required to release and retract this wheel, and after the lugs 23 have been withdrawn from the notches 17, 18 and the wheel and fork are swung in either direction the springs 24 will act to automatically lock these parts in either lowered or retracted position depending upon the direction of swing. The various major parts of the assemblage can be accurately constructed of sheet metal at minimum cost, and the saddle 30 effectively reenforces the channel 12 and pivots 16. The caster wheel support permits the wheel 25 to swivel freely while the lugs 23 and the projection 29 lock this wheel in the several alternate positions.

It should be understood that it is not desired to limit the invention to the exact details of construction and operation of the retractable wheel assemblage herein specifically illustrated and described, for various modifications within the scope of the appended claims may occur to persons skilled in the art.

We claim:

1. In a retractable supporting wheel assemblage for the draft tongue of a vehicle, a channel attachable to the vehicle tongue and having spaced depending walls provided with axially alined end-wise separated pivots extending into the intervening space, each of said walls also being provided with downwardly and horizontally open notches, a yoke having spaced walls confined between said channel walls and provided with elongated slots through which said pivots project to swingably suspend the yoke from said channel while also permitting bodily movement of said yoke toward and away from the pivots, said yoke also being provided with lugs alternately cooperable with said channel notches to interchangeably retain the yoke in lowered and elevated positions, a tension spring having its opposite ends pivotally attached to said yoke and to said channel and being bodily swingable through said intervening space and operable to constantly urge said lugs toward the pivotal axis, and a caster wheel pivotally secured to said yoke.

2. In a retractable supporting wheel assemblage for the draft tongue of a vehicle, a channel attachable to the vehicle tongue and having laterally spaced integral side walls provided with axially alined but endwise separated pivots extending toward each other, each of said walls also having spaced peripheral notches radiating from said pivots, a yoke having laterally spaced integral side walls confined between said channel walls and provided with elongated slots through which said pivots project to swingably suspend the yoke from said channel while also permitting bodily movement of said yoke laterally of the pivots, said yoke also being provided with lugs alternately cooperable with said channel notches to interchangeably lock the yoke in lowered and elevated positions, a tension spring having its opposite ends connected to said yoke and to said channel and being bodily swingable between said pivots and operable to urge said lugs toward said notches, and a caster wheel pivotally suspended from said yoke.

3. In a retractable supporting wheel assemblage for the draft tongue of a vehicle, a unitary sheet metal channel attachable to the vehicle tongue and having laterally spaced depending walls provided with axially alined but endwise separated pivots extending into the intervening space and each wall also having spaced peripheral notches therein, a U-shaped sheet metal saddle directly interconnecting the outer ends of said pivots independently of said channel, a sheet metal yoke having spaced walls confined between said channel walls and provided with elongated slots embracing said pivots within the channel to swingably suspend the yoke from the pivots while also permitting bodily movement of said yoke toward and away from said pivots, said yoke also being alternately cooperable with said spaced channel notches, resilient means bodily swingable between said pivots and being operable to urge said lugs toward said notches, and a caster wheel suspended from said yoke.

4. In a retractable supporting wheel assemblage for the draft tongue of a vehicle, a channel attachable to the vehicle tongue and having therein spaced depending walls and an intervening depending projection, said walls being provided with alined endwise separated pivots extending into the intervening space and also having spaced peripheral notches therein, a yoke having spaced side walls confined between said channel walls and provided with elongated slots through which said pivots project to swingably suspend the yoke from the pivots while also permitting bodily movement of said yoke laterally of the pivots, said yoke also being provided with lugs alternately cooperable with said spaced channel notches to retain the yoke either lowered or elevated, resilient means connecting said yoke and said channel for urging said lugs toward said notches, and a caster wheel pivotally suspended from said yoke and having a fork provided with an opening cooperable with said channel projection to hold the wheel suspended horizontally beneath the vehicle tongue.

5. In a retractable wheel assemblage for the draft tongue of a vehicle, a channel attachable to the vehicle tongue and having therein spaced side walls and an intervening projection, said walls having alined endwise separated pivot means extending into the intervening space and each also being provided with lower and upper notches radiating from the axis of said means, a yoke having spaced side walls provided with elongated slots through which said pivot means project to swingably suspend the yoke from the channel while also permitting bodily movement of said yoke laterally of said axis, said yoke also having thereon lugs alternately cooperable with said channel notches to maintain the yoke in either lowered or elevated position, a spring connecting said yoke and said channel for urging said lugs toward said notches, and a caster wheel having a fork pivotally suspended from said yoke and provided with an elongated opening slidably cooperable under the influence of said spring with said channel projection when the yoke is in elevated position to hold the wheel suspended in horizontal position beneath the vehicle tongue.

6. In a retractable supporting wheel assemblage for the draft tongue of a vehicle, a mounting channel having an upper base attachable to the vehicle tongue and laterally spaced depending side walls provided with axially alined but endwise spaced pivots and with spaced lower and upper notches radiating from the pivots, a U-shaped saddle coacting with said pivots to prevent spreading of the channel walls, a yoke having laterally spaced side walls swingably confined between said channel walls and provided with openings embracing said pivots and with lugs alternately cooperable with said channel notches, a tension spring connecting said yoke with said channel base above and below and between said pivots and independently of the latter, and a caster wheel pivotally suspended from said yoke, said yoke and said wheel being swingable about said pivots to alternately cause said lugs to engage said lower and upper notches and said spring being bodily swingable transversely through the space between the pivots.

References Cited in the file of this patent

UNITED STATES PATENTS

| | | |
|---|---|---|
| 1,938,507 | Wilson | Dec. 5, 1933 |
| 2,296,789 | Johnson | Sept. 22, 1942 |
| 2,525,506 | Wiedman | Oct. 10, 1950 |
| 2,595,453 | Gilmore | May 6, 1952 |
| 2,708,146 | Adler | May 10, 1955 |
| 2,779,049 | Hoddevik | Jan. 29, 1957 |

FOREIGN PATENTS

| | | |
|---|---|---|
| 497,390 | Great Britain | Dec. 15, 1938 |